Patented Apr. 8, 1947

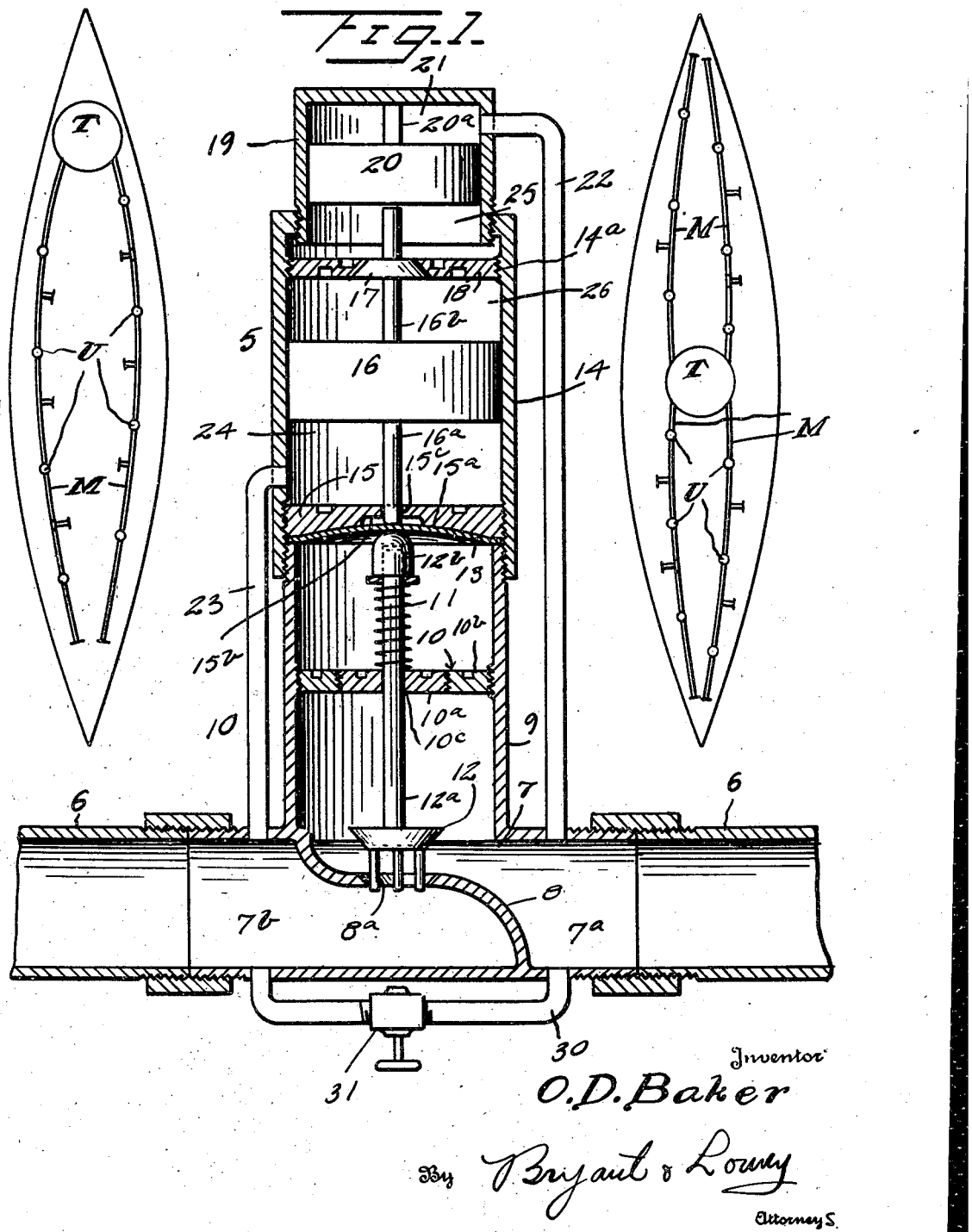

2,418,743

UNITED STATES PATENT OFFICE 2,418,743

PROTECTIVE UNIT FOR FLUID LINES

Ora D. Baker, Tacoma, Wash.

Application October 15, 1943, Serial No. 506,435

11 Claims. (Cl. 137—153)

1

This invention relates to improvements in protective units for fluid lines, and has particular relation to such structures usable in maritime and naval services, although not limited to such particular service, since its units are applicable for use in other fields of service, and under other conditions. The invention is especially applicable for service under wartime conditions and because of its particular applicability in the protection of marine and naval vessels, the disclosure of the invention is presented in connection with its application in this particular service.

Under wartime conditions, whether naval or maritime, vessels are subjected to attack by torpedoes, bombs, etc., and oftentimes with disastrous results; where the vessel is lost, it oftentimes is accompanied by heavy loss of life. One of the causes of the latter is the presence of inflammable liquids generally carried by the vessels—generally in one or more storage tanks from which it is piped to various parts of the ship for use; where the attack disrupts one or more of these lines, the inflammable liquid is released and thus adds its effect in destroying the ship. In some cases, these piping lines include manually-operable valves for the purpose of meeting emergencies, but these require the presence of seamen to close them at the time of the emergency, but where the escaping fluid has been ignited, it becomes difficult if not impossible, to close the valve, with the result that the continued escape of the fluid rapidly augments the fire conditions and renders more difficult the saving of life.

The present invention cannot be completely preventive, due to the fact that if the "hit" is at a point where the supply tank is itself disrupted or affected, it would be impossible to afford protection against escape of the fluid. But where the hit does not affect the supply tank itself, but does affect the piping which carries the fluid to the service points, the escape of fluid becomes limited to a small amount through the automatic action of one or more of the units employed in the system. For instance, with a unit applied to the individual pipe passing through the space between adjacent bulkheads, a "hit" which affected the pipe or pipes within this space would instantly render the unit or possible adjacent units active to close the delivery of fluid to the disrupted zone without, however, affecting the delivery of fluid to other points between such point and the supply tank, although points beyond the disrupted point would be affected—by stoppage of flow—due to the series arrangement

2 of the units. Hence, the invention will provide protection against the effects of escaping fluids at all points excepting where the disrupting effect is made manifest on the supply tank itself.

While the invention, in service, whether in the above and other fields, includes the piping or conduits of the system under protection, the fundamentals of the invention are found in the form of the unit used—in duplication within the system—and the arrangement of the units within the system in order to provide the desired protection. The units are generally of similar formation and applied to the piping or conduits as individuals and in spaced-apart relation, thus setting up more or less of the characteristics of a series arrangement of units within each of the lines of the system. When so arranged, any one of the units when brought into protective activity, instantly changes that portion of the line beyond the unit into inactivity while retaining the line between the unit and the supply tank unaffected as to activity. Hence, although the units are themselves individual in structure and type, they are also co-operative in carrying out the underlying purposes of the invention.

And, due to the particular structure of the unit, the protective assembly may afford protection of a different type to the system. Under usual service conditions the units are not materially affected by the service actions. However, should a material and constant leak condition develop in the line, it may result in a gradual loss of flow at one or more of the distributing stations, the presence of which will serve as an indicator of the presence of the leak and permit it to be readily found by testing as between stations which do not have the flow reduction and those at which it is present. This is due to the particular arrangement and operation of the unit in service.

To these and other ends, therefore, the nature of which will be more clearly understood as the invention is hereinafter described in detail, said invention consists in the improved combinations and constructions hereinafter more clearly pointed out in the specification, illustrated in the accompanying drawings, and more particularly pointed out in the appended claims.

In the accompanying drawings, in which similar reference characters indicate similar parts in each of the views—

Figure 1 is a central vertical sectional view of one of the units shown as applied to a tubing section or main forming part of one of the lines of a system being protected thereby.

Figures 2 and 3 are diagrammatic views illustrating two different arrangements of the supply tank and lines leading therefrom and an illustrated assumed arrangement of the units therein.

While the invention is being illustrated in connection with the protection of vessels of maritime and naval services, the invention is not limited to such uses, since it is applicable for use in other services. For instance, it may be applied to installations of water or gas lines of city systems for the purpose of protection against the effects of bombing or other attacks under which the supply lines would be subject to disastrous rupture and breakage. Other fields of use in which normal operations might be affected under varied conditions, will be more or less apparent.

As will be understood, liquid flow relative to an opened valve opening provides no material differences in pressure in the main on opposite sides of the valve seat, when all dispensing openings are closed; when a dispensing opening is opened, the initial response is a lowering of the pressure on the outlet side of the adjacent unit, but since the open tap (dispensing opening) permits flow of the fluid between the supply tank and tap, such initial differential in pressure is rapidly reduced, tending to restore an approximate equalization, but at a lowered pressure value; with the closing of the tap, the pressures rapidly build up until the normal pressure conditions are restored. This represents the normal service operation. In such operation the value of the pressure variations are dependent upon the number of taps which may be concurrently open, but inasmuch as the mains are so arranged as to provide adequate supply when a plurality of taps are open concurrently, the pressure reduction variations are normally small, especially where, as is usual, the taps are opened only at intervals, and do not provide a continuous drainage.

Where, however, there is a sudden disruption of the main in the zone controlled by the unit, the volume of fluid being lost is suddenly increased a number of times beyond that which occurs during normal service, and the initial differential in pressure becomes largely increased, and is followed by a rapid flow of the fluid through the main tending to materially decrease the pressure of the system, not only providing for an actual escape of fluid from the main but also setting up supply draining conditions within the entire system. If the fluid is inflammable, the escaping fluid, becoming ignited, becomes a powerful fire hazard, since the rupture affords a continuous supply of the fluid to feed the fire.

These conditions become especially hazardous in marine and naval service during wartime. While the damage of a torpedo hit may be great, with loss of the vessel as a possibility, it is not necessarily so in the absence of fire; but where the fluid mains of an inflammable fluid system are disrupted—thus opening up the fluid supply as feeding source of high combustible nature to the fire—the disaster becomes appalling through the presence of the fire, even though the vessel would not, in the absence of fire, become destroyed. Prior practice attempted to meet the condition by the use of hand valves placed at intervals and designed to be closed by manual action of a member of the crew, but this presents not only a time factor, but requires the crew member to possibly enter the zone of the fire itself, with possible loss of life. To avoid these conditions as far as possible, is the object of the present invention, by providing for an instantaneous closing of the valve of the particular zone where this sudden reduction of pressure is made manifest as the initial evidence of the change from the normal conditions.

The heart of the invention is in the form of a unit 5 designed to be mounted in a main or line portion of a supply system designed, for instance, to deliver a gaseous or liquid fluid from a supply source to various dispensing points or stations, the main being indicated at 6. The unit has the characteristics of a valve formation having a base zone 7, formed with an inlet 7a and an outlet 7b, suitably threaded to be secured to the main 6. The base zone includes a partition 8 carrying a valve opening 8a, the partition tending to separate the inlet and outlet, excepting for the opening 8a, and with the exception of the normally-closed relief structure presently described; hence, under normal conditions, opening 8a provides for flow of fluid through the base zone to establish the main flow path.

The body of the valve is shown as extending vertically upward from the base zone, but it is readily understood that this is illustrative only, since the body may extend in any direction normal to the main axis. The body is formed of a sectional casing, generally tubular, this being preferred to permit ready assemblage of the unit. The lower section 9 is secured to the base zone, and is preferably internally threaded to permit of the insertion and positioning of a partition 10 which is threaded therein to a position about midway of the length of the section, and is itself preferably formed of an inner member 10a and an outer member 10b, threadedly connected, with member 10 carrying a central opening 10c for the passage of the valve stem. Partition 10 tends to restrict flow of fluid from the main, but is designed mainly to provide a seat for a spring 11, the threaded connection of its parts permitting adjustment of the spring tension.

The valve, indicated at 12, has its body of suitable form to co-operate with the valve opening or seat 8a, a preferred formation being that of the usual pronged type to form a bearing for the valve body end without obstructing fluid flow but providing for proper seating of the valve when the latter is closed. The valve is provided with a stem 12a of a length sufficient to extend through partition 10 and have its upper end—preferably provided with an enlargement 12b—designed to abut the under surface of a flexible diaphragm 13. Spring 11 is carried by stem 12a with its ends contacting member 10 and enlargement 12b respectively, and tends to hold valve 12 in its open or raised position.

Numeral 14 indicates a second (middle) tubular section having its lower end internally threaded for attachment to the upper end zone of section 9, and also to receive and position a partition 15, the lower face of which is preferably concave, as at 15a, the latter normally forming a seat for flexible diaphragm 13, with the peripheral zone of the latter being clamped between diaphragm 15 and the upper edge of section 9. Concave face 15a is provided with a depressed central zone 15b, with the body of the partition provided with an opening 15c for the passage of a piston stem 16a which extends through opening 15c into contact with diaphragm 13, the latter completely overlying the end of the stem and recess 15b.

Section 14 is designed to form the casing section for a piston 16 dimensioned to have a working fit within the section and be capable of a reciprocating movement in the section when required during the operation. Piston 16 carries the stem portion 16a extending downwardly with its lower end resting on flexible diaphragm 13; the piston also carries an upwardly-extending stem 16b which carries a valve 17 at an intermediate point. Valve 17 is designed to co-operate with a valve seat formed in a partition 18 carried by the section, the valve and its seat being arranged to permit valve 17 to open in a downward direction. Partition 18 is peripherally threaded and mounted in an internally threaded zone 14a adjacent the upper end of section 14, the arrangement being such that during the assembly, partition 18 may be freely inserted into the lower end of section 14 and moved into the threaded zone 14a prior to the insertion of piston 16; after the insertion of the latter, partition 15 is positioned in the section, after which partition 18 can be accurately adjusted by manipulation through the upper end of section 14 to ensure that valve 17 will accurately seat when the lower end of stem 16a is in contact with the flexible diaphragm 13 seated on the concave face 15a.

Numeral 19 designates the end section of the casing and is closed at one end, with the opposite end zone externally threaded to be secured within the upper end of section 14. Section 19 is of materially less diameter than section 14, with the upper end of the latter properly dimensioned to receive section 19. Section 19 is designed to receive a piston 20 provided with an upwardly-extending stem 20a which serves to permanently space the piston from the end of the section to thereby form a space or chamber 21 above piston 20. In practice, the upper end of stem 16b is spaced a small distance from the bottom face of piston 20 when stem 20a is in contact with the closed end of section 19.

Numeral 22 designates a pipe connecting chamber 21 with the inlet side of the base zone of the unit, while 23 indicates a similar pipe connection extending from the chamber 24 (located between piston 16 and partition 15) and the outlet side of the base zone, pipes 22 and 23 thus placing these chambers in open communication with the base zone on opposite sides of valve opening or seat 8a, permitting these chambers to fill with the content of each under the pressure of the fluid carried within the inlet and outlet sides of the base zone.

The relative diameters of pistons 20 and 16 are such as to provide a considerable differential in area between the respective faces of these pistons exposed to the respective fluid chambers, with the differential favoring the exposed face of piston 16, this difference being such that the pressures on piston 16 render said piston dominant over those on piston 20 during normal operations of the system, thus retaining piston 16 in its upper position with valve closed, the closed valve limiting the upward travel of piston 16. Piston 20 can move downwardly under the pressure in space 21, until the piston contacts the upper end of stem 16b. The spaces on opposite sides of partition 18 are normally filled with air and may possibly carry small amounts of fluid which may seep past the pistons.

In normal operations of the system, the pressure of the inlet side of the main will move piston 20 downward into contact with the upper end of stem 16b and tend to slightly compress the air content of space 25 above partition 18, but without opening valve 17, due to the differential in pressure conditions set up by the areal differences of the two pistons; this is the normal condition when the system is at rest. Under normal service conditions, the initial surge when a tap is opened, may tend to disturb these conditions momentarily, in which case, if present, there might be a tendency to slightly open valve 17, due to the momentary change in pressure conditions, but such change, if present, does not affect the operating conditions at valve 12; if the volume being discharged through the tap is considerable per unit of time, a material change in differential values is produced, permitting the momentary surge value to be sufficient to render the pressure on piston 20 sufficiently dominant over that in chamber 24, as to cause piston 20 to move piston 16 downward; a volume such as this could be obtained by opening a number of taps concurrently, but since the valve units are distributed—as presently explained—the volume applicable to a single unit is comparatively small.

Following the initial surge it is obvious that the ensuing flow of fluid through the valve seat 8a will tend to restore the normal differential relationship between inlet and outlet of the base zone, although possibly at a slightly reduced pressure value while the flow continues; hence, should valve 17 be opened slightly by the surge, it will be closed again by this restoration of differential conditions. It is possible, of course, that there may be a slight lag in such restoration, due to the fact that connection 23 is located on the side from which the surge is drawing fluid and therefore directly subject to the drawing effect of the opened tap, while connection 22 is on the opposite side of the valve and therefore subject only to the reduction effect of the fluid flowing past the open end of the connection; when and if present, its only effect will be to tend to slightly extend the period of dominant pressure on piston 20 produced by the initial surge. When the tap is closed, the main resumes its normal condition. Only the unit in the immediate proximity of the opened tap is thus directly affected, since the remaining units of the main ahead of the one thus made active, are subject only to the flowing fluid in the main, so that there is less variation in differential values so far as the remaining units are concerned.

As is apparent, the seated valve 17 will limit the upward travel of piston 16; hence, the slight space between the upper end of stem 16b and piston 20 will be instantly closed by the inlet pressure in chamber 21, by downward movement of piston 20 until such contact is had; this movement of piston 20 may tend to slightly compress the air in chamber 25, but since the normal pressure of the latter is materially below that of the inlet pressure of the main, such compression is of no material effect in the operation of the piston. Should valve 17 be slightly opened during the service operation, it would permit communication between chambers 25 and 26 (the latter being between piston 16 and partition 18) and permit equalization of the air pressures in the two chambers. Under normal service operations, such equalized pressure would be substantially retained, since it would be necessary for piston 20 to raise out of contact with stem 16b to develop conditions for increasing the pressure in chamber 24, and since such movement would simply permit the air content to resume its normal pressure or a slight depression value there would be no material change.

The above presents the normal service conditions of the system, under which there is no normal material change in the position of valve 12, although there may be many withdrawals of fluid from the main through the opening of taps. However, should there be a violent disruption of the main on the outlet side of the unit, the results will be different. The instant such disruption is made manifest, it is apparent that the large volume discharge will instantly lower the pressure value on the outlet side of the unit as to create a voilent surge condition within the main at the point of disruption, with chamber 24 instantly affected, to so change the differential conditions that the pressure value on piston 20 becomes superior to that on piston 16, with the result that piston 20 will instantly respond to the superior pressure and be moved rapidly downward, moving piston 16 downward with it (aided by the draining effect of the discharging fluid from chamber 24), thus causing the lower end of stem 16a to apply pressure on flexible diaphragm 13 to flex the same downward, and thus apply pressure on valve stem 12a, against the tension of spring 11, and thereby instantly move valve 12 to its seated position, thus closing valve opening 8a, and stopping the supply of fluid through the opening. This immediately places the full supply pressure of the inlet side on to piston 20, while the pressure value in chamber 24 continues to decrease due to the draining action through the disruption, with the result that valve 12 is forcibly held to its seat, cutting off communication from the supply to the point of disruption.

It may be true that units more remote from the supply than the one immediately rendered active may remain open—since the point of disruption is on the inlet side of the units of remoter position, but while this would permit a supply from this portion of the main to the point of disruption, such supply is obviously limited due to the small cross-section of the main and the fact that the end of the main is closed; hence, not only is the quantity comparatively small in amount, but will be discharged at a slower rate since there would be no supply of air to prevent the formation of a vacuum due to loss of liquid from the closed end of the main excepting at the point of disruption. And while this would reduce the pressure in such remote portion of the line, it will have no material affect on the position of the parts, in presence of spring 11, due to the fact that the upward movement of the flexible diaphragm is limited by contact with the concave face of partition 15. Since the flow of fluid from such remote zone of the main would be in the opposite direction, there might appear to be conditions for moving piston 16 upward, but such movement is prevented by seated valve 17; piston 20 would not be materially affected, since it could move only the distance provided by the space between it and stem 16b, and the pressure in chamber 21 would not fall materially below atmospheric pressure—if actual depression pressure values were to develop within such remote portions of the main, the flow of fluid would tend to stop since atmospheric pressure is present at the point of disruption.

As is apparent, the arrangement renders piston 16 readily responsive to reduction-in-pressure changes in space 24—stem 16b is not connected to piston 20, and valve 17 opens downward, the slightly-increased-air pressure conditions in space 26 (due to equalized pressures in chambers or spaces 25 and 26 produced whenever valve 17 opens)—aiding in this respect; but actual and material changes in the position of piston 16 downwardly are subject to the activities of the flexible diaphragm 13 and spring 11. Flexible diaphragm 13, in the position shown in Figure 1, is not materially strained, since it is concaved; however, downward movement of stem 16a materially increases the strain (maximum when the diaphragm is at its mid-position) due to the natural resistance to change present under these conditions; during the rapid movement of the parts in presence of main disruption, as previously described, the flexible diaphragm reverses its curvature, passing beyond the mid-position. In addition, spring 11, which has a tension value slightly greater than the maximum strain value of the flexible diaphragm when both are at the mid-position of the diaphragm 13 (for a purpose presently described), provides a resistance value against movement downward of piston 16, although in the Figure 1 position, the spring has its least tension value. Hence, piston 16, while somewhat sensitive to changes in pressure in chamber 24, so far as reduction in fluid pressure in chamber 24 is concerned (valve 17 limits the upward movement under undue fluid pressure increase), but actual downward movement of piston 16 is subject to the opposing resistance of flexible diaphragm 13 and spring 11, so that these provide a controlling agency in this respect, with the control of particular characteristic understood from the following:

In the Figure 1 position of the parts—at which time the system is at rest and filled with the fluid—the flexible diaphragm 13 and spring 11 are at their lowest tension values; hence, in this position, the resistance of these elements is at minimum value and piston 16 is movable downward under small differences in fluid pressure in chamber 24, thus enabling piston 16 to respond to small service conditions, but with slight—if any—movement of the piston due to the large area of the piston. Under heavier service conditions, the downward movement of piston 16 begins to place flexible diaphragm 13 under strain and to increase the spring tension, thus affording greater resistance to such piston movement, augmenting the resistance value of spring 11. This increase in resistance of spring 11 continues throughout the range of piston movement, but in the flexible diaphragm it continues only until the latter passes its dead center position, after which it decreases, with the strain pressure becoming active in opposition to the spring. As a result, the service range of the unit can be of considerable extent, since as long as the flexible diaphragm 13 does not pass the dead center position, it acts to augment the resistance of spring 11 in opposing the downward movement of piston 16; and since both provide for increasing tension during the period, it is apparent that the service range may be considerable, dependent, of course, upon the values placed upon the diaphragm and spring when the unit is formed—the values would be determined by the character of the service to be performed by the system. Within this range the return movement of the piston in response to closing of taps is rapid, since the developed power of the diaphragm and spring is augmenting the fluid pressure increase in chamber 24.

When, however, the flexible diaphragm passes its dead center position, the reversal in direction of power application of the flexible diaphragm 13 opposes the spring power—tending to materially neutralize the latter (with this effect greatest just after the diaphragm has passed the dead center zone) and downward movement of piston 16 can proceed rapidly, since the main control then passes to the fluid pressure in chamber 24, and since the value of this, under main disruption conditions, rapidly decreases, it is apparent that the succeeding downward movement of the piston will be with rapidity, even though the active pressure on piston 20 may be materially reduced by the development of the rapid flow through the unit produced by the disruption of the main; in other words, after the service range has been passed, valve 12 will move to its seat with great rapidity—approaching a snap action.

From this, it is apparent that the service range of the unit is determined not only by the pressure differences in chamber 24, but also by the flexible diaphragm 13 and spring 11, these all co-operating in determining the extent of this range. This permits of the presence of a wide service range without excess unit dimensions, and yet affords practically a snap closing of valve 12 when this range is exceeded, and even though the reduced pressure in chamber 21 set up by the rapid increase of fluid flow in the main would tend to decrease the differential values on opposite sides of valve opening 8a, since the differential value between such opposite sides will then be sufficiently in favor of piston 20 as to ensure the development of the snap action.

While the above description deals with the service conditions and with the conditions produced by disruption of the main, there is an additional condition possible and for which the unit is equipped to meet—the presence of an actual leak in the main of material amount and which is active constantly, but does not itself produce a flow amount in excess of the service range; a slight leak may not be seriously detrimental to a system, but when it reaches material dimensions, it can become a source of danger.

When such leak develops between successive units, for instance, it provides the initial surge condition followed by the succeeding flow development. If the leak is of material dimensions, the surge will reduce the fluid pressure in chamber 24 with consequent lowering of piston 16 and opening of valve 17; since the leak remains constant, piston 16 will take a position in which valve 17 remains constantly open. When normal service operations take place under these conditions, it is apparent that the opened taps will increase the volume being discharged from the main, and therefore still further lower the pressure in chamber 24 during the surge, thus permitting further downward movement of piston 16; if the leak should be of such value as to bring the position of piston 16 close to the lower limit of the service range, it is possible that the surge coming from a succeeding service operation will be sufficient to carry diaphragm 13 past its dead center position, in which case the sudden change in the resistance characteristics produced by the reversal of the strain effect of the diaphragm, may have the effect of actually seating valve 12; or, if valve 12 is not completely seated, the reversal of diaphragm 13 may prevent the return of the diaphragm across the dead center, and thus leave valve 12 partially closed, a fact which will be indicated by the decreased flow at the taps beyond the leak. Should the latter occur, the presence of a leak is made manifest—as would be the case should valve 12 completely close—since the system normally should not present the conditions of a deficiency; by testing various taps, the location of the leak becomes apparent, since the taps ahead of the leak would present little or no deficiency.

From this it is apparent that in addition to the ability to meet the acute emergency conditions of a disrupted main, the unit will also serve to indicate the presence of a serious leak and its approximate location.

Due to the fact that stem 16b is not secured to piston 20 the pistons are free to move relative to each other, so far as permitted by the spacing between the upper end of stem 16b and piston 20; in practice, piston 20 will generally rest in contact with the end of the stem, but should occasion so require, limited relative movement can be had. As a result, there can be no air-lock conditions set up within the piston assemblage to affect the desired operation. And should there be seepage of fluid into chambers 25 and 26 around the pistons, due to the fluid pressures on the outer faces of the pistons, the presence of valve 17 enables the equalization of the air pressure in these chambers each time the valve is unseated; the seepage fluid will generally drain to the lower chamber whenever valve 17 is opened, and while this may tend to increase the air pressure values in these chambers, the margin between the fluid pressures and atmospheric pressure is of such extent as to provide no difficulty in this respect.

As will be understood, whenever valve 12 becomes seated, it closes valve opening or port 8a, and thus practically eliminates fluid pressure from the outlet side of the valve; as a result, the valve will remain seated, due to the fluid pressure in chamber 21. To open valve 12, the unit is provided with a by-pass 30, the opposite ends of which communicate with the inlet and outlet sides of the base zone of the valve. This by-pass is provided with a suitable manually-controlled valve 31, which is normally closed. but which, when opened, permits passage of fluid from the inlet to the outlet side of the zone independent of the valve opening 8a, thereby building up the fluid pressure on the outlet side, including the fluid content of chamber 24, the pressure of the latter then moving piston 16—including stem 16a, 16b—to its upper position and raising piston 20. Since spring 11 has a normal tension sufficient to shift flexible diaphragm 13, and has its power increased by compression when valve 12 is closed, the upward movement of valve 16, permits spring 11 to raise the valve from its seat to the normally-open position and at the same time restores the flexible diaphragm to its normal working position indicated in Figure 1.

As indicated above, the unit is particularly designed for service as a part of a system which includes a plurality of such units. To illustrate this, Figures 2 and 3 illustrate diagrammatically different applications of the system to a vessel of the maritime or naval type, Figure 2 showing the supply tank T located in an end zone—preferably the stern—of the vessel, while Figure 3 indicates the tank as located in a central zone. Mains M extend from each tank, with each main including a number of the units—indicated at U—in spaced-apart relation in the direction of length of the mains, the number employed depending upon the dimensions and structure of the vessel (the space between adjacent bulkheads may have an individual unit). A unit is preferably located in each main adjacent to the tank end of the latter in order to preserve the supply in the event of a disruption of the main in the vicinity of the tank.

As is apparent, the unit ahead of the point of disruption of a main will instantly become active to close the supply to the portion of the main beyond the active unit, but will have no effect on other mains not disrupted. In other words, each unit is a potential detector of the presence of a damaged or abnormally affected main and an agency rendered active rapidly (generally instantly) for protecting the supply against excessive outflow such as could provide fuel for a disastrous conflagration. Obviously, the units would be valueless where the torpedo attack reaches the tank itself, since the entire tank content is then rendered instantly active to feed the conflagration; when the tank itself is not affected, the units form potential protecting means for preserving the safety of the tank and vessel by instantly closing the supply of the fluid to the affected point; if more than one main is affected the closure action takes place in each of the affected mains by the unit of the affected main immediately in advance of the point of disruption; if a unit itself is affected, the service is taken up by the unit ahead of it—in other words, the outlet side of the unit made active, is always ahead of the point of disruption, and the unit made active is selected by the disruption itself. Hence, where the attack does not directly affect the tank, the system affords a measure of protection in preventing the supply of large quantities of inflammable fluid to aid and increase the conflagration.

While the unit is being described in connection with maritime and naval service, and in connection with inflammable fluids, it is apparent that it may be employed in other fields and with other fluids or gasses, and use in such fields and for such purposes is contemplated as within the invention. For instance, it may be employed in connection with water or gas mains as a protection measure operating along somewhat similar lines—abnormal conditions within the mains due to excessive leakage, or main disruption as a reaction to bombing, seismic disturbances, etc., will illustrate such use. In other words, mains utilizing pressure conditions to provide flow of the content, are potential fields of service.

The particular dimensions of parts shown in the drawings are illustrative only; and the specific forms of members of the unit assemblage are more or less illustrative, since the units will generally be designed to meet the particular conditions of the installation in which they are to be employed. For instance, the service range may differ in different installations, due to the type of service; the pressures used may differ; the fluid may be liquid or gaseous, etc.; these indicate some of the features which may control in the specific design and dimensions of the unit. But in each the fundamental characteristics of the invention are present. And while I have shown and described my invention and pointed out its general characteristics, etc., it will be understood that changes and modifications therein may be found desirable or essential in meeting the exigencies of use or the desires of the user, and I therefore reserve the right to make any and all such changes or modifications therein as may be found necessary or essential insofar as the same may fall within the spirit and scope of the invention as expressed in the accompanying claims, when broadly construed.

I claim:

1. A protective control unit for supply mains of fluid supply systems, wherein the system normally provides fluid delivery from a supply tank to service points of the main at will with the unit inactive to disturb such fluid delivery, and wherein the unit is rendered active by abnormal or disruptive action of or on the main in the vicinity of the unit to thereby cause the unit to automatically close the main to fluid delivery from the tank to the affected point of the main, such unit comprising a sectional casing having a base zone forming a flow path for the flow of fluid therethrough, said zone having a valve seat located within such flow path of predetermined dimensions, a normally-open reciprocatory valve for said seat provided with a stem, said valve having a configuration to permit valve movements in a seating direction within a service range without materially affecting delivery flow of fluid through such seat, and means carried by the unit and subject to fluid pressure conditions on opposite sides of such seat for providing and controlling movements of the valve in the direction of its seat, said means including a pair of unconnected but co-operative axially alined pistons differing in areal dimensions, the piston of lesser areal dimension being subject to the pressure conditions of the inlet side of the seat and the piston of larger areal dimensions being subject to the pressure conditions of the outlet side of the seat to thereby place the pressure conditions of such outer side as dominant in control of the valve movements in its seating direction, said means also including a pair of resilient elements co-operative as a combined resistance to valve movements in the direction of valve closure and active in determining and establishing a service range for the valve within which the valve movements are ineffective in materially disturbing the delivery flow of fluid through the seat, said elements being additionally co-operative to reduce resistance values during valve movements in the valve-closing direction beyond such range to thereby provide rapid closing action of the valve in presence of abnormal rate of flow through said unit.

2. A unit as in claim 1 characterized in that one of such pair of elements is in the form of a flexible diaphragm active in providing valve movements in the closing direction and in determining limits of the service range.

3. A unit as in claim 1 characterized in that one of such pair of elements is in the form of a flexible diaphragm active in providing movements of the valve in closing direction, said element resiliency being active within the service range to augment the progressive resistance to valve closing movement and active beyond such range in decreasing such resistance to aid in providing snap closure of the valve.

4. A unit as in claim 1 characterized in that one of the pair of elements is in the form of a compression spring carried by the valve stem, the other of said elements being in the form of a flexible diaphragm positioned to contact the end of such valve stem, said latter element being active in the valve closing movements to augment the resistance of the first element within the service range portion of the valve travel and active in opposition to the first element beyond such range to thereby present resistance-neutralizing activity during movement of the valve to closed position in response to an abnormal rate of flow through said device, whereby the valve will seat with rapidity after passing the service range limit in the valve closing direction.

5. A unit as in claim 1 characterized in that one of the pair of elements is in the form of a compression spring carried by the valve stem, the other of said elements being in the form of a flexible diaphragm positioned to contact the end of such valve stem, said latter element being active in the valve closing movements to augment the resistance of the first element within the service range portion of the valve travel and active in opposition to the first element beyond such range to thereby present resistance-neutralizing activity during movement of the valve to closed position in response to an abnormal rate of flow through said device, whereby the valve will seat with rapidity after passing the service range limit in the valve closing direction, the flexible diaphragm passing through a dead-center position when moving from one extreme position to the other, the compression spring having a power value sufficiently greater than that of the diaphragm in the dead-center zone of the latter as to place the spring as a power source for the return of the diaphragm during valve-opening movements of the valve and its stem.

6. A unit as in claim 1 characterized in that the piston of larger areal dimension carries an axial stem formation extending in opposite directions from the piston, with one stem portion positioned to co-operate with the other piston and the other stem portion positioned to co-operate with one of the pair of elements to thereby subject the latter to the movements of the piston in the valve-closing direction.

7. A unit as in claim 1 characterized in that the piston of larger areal dimension carries an axial stem formation extending in opposite directions from the piston, with one stem portion positioned to co-operate with the other piston and the other stem portion positioned to co-operate with one of the pair of elements to thereby subject the latter to the movements of the piston in the valve-closing direction, the casing being provided with a partition located intermediate the pistons, with the partition having a valve seat through which the first stem portion extends, said portion carrying a valve adapted to seat on such valve seat and thereby limit the travel of the piston of larger areal dimension in the direction opposed to the valve-closing direction.

8. A unit as in claim 1 characterized in that the casing carries a partition intermediate the piston zone and the pair of resistance-developing elements, with the partition active to limit the movements of the elements in the direction opposite to the valve-closing direction, said partition having an axial opening for the passage of the stem of the adjacent piston to thereby render the elements responsive to piston movements in the valve-closing direction.

9. A unit as in claim 1 characterized in that the casing carries a partition intermediate the piston zone and the pair of resistance-developing elements, with the partition active to limit the movements of the elements in the direction opposite to the valve-closing direction, said partition having an axial opening for the passage of the stem of the adjacent piston to thereby render the elements responsive to piston movements in the valve-closing direction, movements of the piston in the opposite direction being compensated by element movements produced by the resilient activities of the elements.

10. A unit as in claim 1 characterized in that one of the pair of elements is in the form of an imperforate flexible diaphragm carried by the casing and dimensioned to provide a dished contour when positioned in either of its extremes of movement, the movements of the element on one side of its approximate dead-center position being active in the control of the service range of the unit, the element movements beyond the approximate dead-center position in valve-closing direction being active in reducing resistance to valve closing movements.

11. A unit as in claim 1 characterized in that one of the pair of elements is in the form of an imperforate flexible diaphragm carried by the casing and dimensioned to provide a dished contour when positioned in either of its extremes of movement, the movements of the element on one side of its approximate dead-center position being active in the control of the service range of the unit, the element movements beyond the approximate dead-center position in valve-closing direction being active in reducing resistance to valve closing movements, said element being supported by a partition carried by the casing when the element is in one extreme of element flexing movement, the stem of the closable valve being in contact with such flexible diaphragm element during movements in valve closing direction to thereby cause the closed valve and its stem to support the element in its opposite extreme of movement.

ORA D. BAKER.

REFERENCES CITED

The following references are of record in the file of this patent:

UNITED STATES PATENTS

| Number | Name | Date |
| --- | --- | --- |
| 2,041,862 | Rhodes | May 26, 1936 |
| 2,012,351 | Riney | Aug. 27, 1935 |
| 1,956,010 | Diescher | Apr. 24, 1934 |
| 1,633,483 | Graham | June 21, 1927 |
| 2,041,863 | Rhodes | May 26, 1936 |
| 2,070,421 | Chisholm | Feb. 9, 1937 |
| 1,389,370 | Metzger | Aug. 30, 1921 |